United States Patent [19]

Van Gerpen

[11] 4,363,377
[45] Dec. 14, 1982

[54] ACTIVE SEAT SUSPENSION CONTROL SYSTEM

[75] Inventor: Harlan W. Van Gerpen, Cedar Falls, Iowa

[73] Assignee: Deere & Company, Moline, Ill.

[21] Appl. No.: 189,637

[22] Filed: Sep. 22, 1980

[51] Int. Cl.³ .............................................. B60G 17/00
[52] U.S. Cl. ..................................... 180/282; 73/652; 248/550; 318/648
[58] Field of Search .......................... 180/41, 282, 313; 73/652; 318/648, 603, 649; 248/550; 297/345

[56] References Cited

U.S. PATENT DOCUMENTS

| | | | |
|---|---|---|---|
| 2,742,779 | 4/1956 | Stein | 73/652 |
| 3,233,886 | 2/1966 | Saffell et al. | 267/1 |
| 3,345,558 | 10/1967 | Christian | 323/367 |
| 3,674,094 | 7/1972 | Kuntz | 318/348 X |
| 3,701,499 | 10/1972 | Schubert et al. | 244/17.27 |
| 3,951,373 | 4/1976 | Swenson et al. | 248/400 |
| 4,198,025 | 4/1980 | Lowe et al. | 248/550 |

OTHER PUBLICATIONS

"Curing the Tractor Seat Shakes: How About Electrohydraulics?", Suggs and Stikeleather, *IMPLEMENT & TRACTOR*, Oct. 7, 1971, pp. 24 & 25.
"The Development of an Active Seat Suspension System for Off-Road Vehicles", Stikeleather and Suggs, ASAE Paper No. 68-632, Dec. 10, 1968.
"An Active Seat Suspension System for Isolation of Roll and Pitch in Off-Road Vehicles", Young and Suggs, ASAE Paper No. 73-156, Jun. 17, 1973.

*Primary Examiner*—Joseph F. Peters, Jr.
*Assistant Examiner*—Michael Mar
*Attorney, Agent, or Firm*—Fraser and Bogucki

[57] ABSTRACT

An active seat suspension control system provides for continuous adjustment of the height of a tractor seat in response to movement of a mass within a vibrometer. The vertical position of the vibrometer mass is coupled to adjust one of a pair of potentiometers in a bridge circuit with the other potentiometer being adjusted by the actual height of the seat. During extreme movement of the tractor, the control system is disabled by an arrangement which includes a pair of limit switches at opposite extremes of vertical movement of the vibrometer mass and a circuit which effectively uncouples a source of pressurized fluid to a hydraulic cylinder coupled to adjust the vertical position of the seat. The control system is coupled through the tractor ignition switch to the tractor power supply so as to be disabled except when the ignition switch is turned on. Following disablement, the control system may be reset by a switch which simultaneously moves a variable resistor defining a gain control within the bridge circuit to a minimum gain position to provide minimum responsiveness upon startup. Additional variable resistors in the bridge circuit adjust the stiffness of the control system and the initial height of the seat. The vibrometer mass is suspended via a cable from the outer end of an arm extending laterally from the free end of a rod having an opposite fixed end so as to provide a desired spring suspension of the mass through twisting of the rod.

21 Claims, 8 Drawing Figures

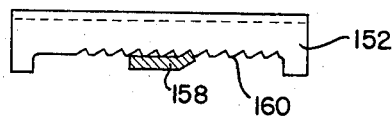
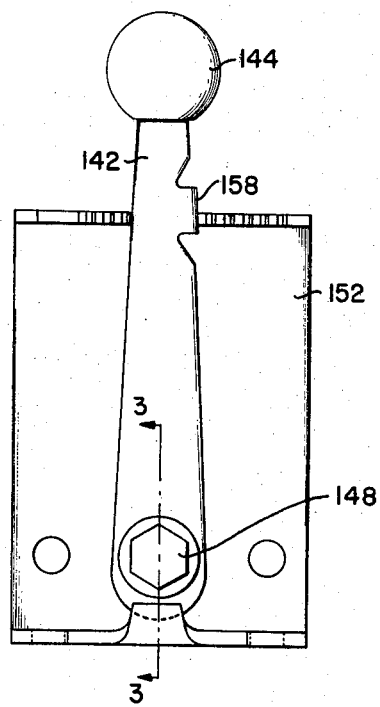
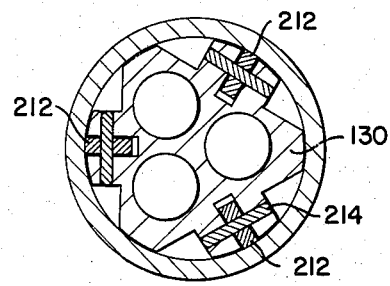
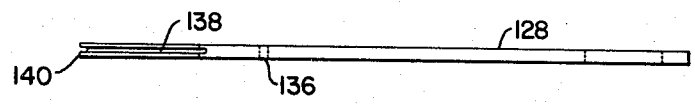

ACTIVE SEAT SUSPENSION CONTROL SYSTEM

BACKGROUND OF THE INVENTION

1. Field of the Invention

The present invention relates to arrangements for providing movement of the seat of an agricultural tractor or similar vehicle to cushion the operator from shocks and other undesired motions, and more particularly to an active seat suspension system in such vehicles in which the seat is actively caused to move in synchronism with motion of the vehicle so as to compensate for such motion.

2. History of the Prior Art

It is known to utilize an active seat suspension in an agricultural tractor or similar vehicle which undergoes substantial off-road use or otherwise encounters the type of terrain which subjects the vehicle and the operator thereof to significant jolts and bumps and other undesired motions. An active seat suspension system responds to motions of the vehicle by actively moving the vehicle seat in a direction and by an amount so as to compensate for such motions. Such systems are different from the more common passive systems such as those which attempt to damp or attenuate movements of the seat in horizontal or vertical directions.

An example of an active seat suspension system for tractor seats and the like is provided by an article entitled "Curing The Tractor Seat Shakes: How About Electrohydraulics?" by Suggs and Stikeleather on pp. 24 and 25 of the Oct. 7, 1971 issue of *Implement and Tractor*. This article which relates to ASEA Paper No. 68-632 by L. F. Stikeleather and C. W. Suggs published in December of 1968 and an article in the same year by Larry Franklin Stikeleather entitled "The Development Of An Active Seat Suspension System For Off-Road Vehicles" from the Department of Biological and Agricultural Engineering of North Carolina State University at Raleigh, generated in connection with a graduate thesis, describes an active suspension system in which a vibrometer and electrical bridge circuit are used to adjust the height of a tractor seat in response to tractor movement sensed by the vibrometer. The *Implement and Tractor* article notes the undesirability of low frequency vibration and at the same time the suitability of a vibrometer for sensing such low frequency vibrations so as to position the height of the seat using an active suspension system. Other examples of seat or platform suspension systems for both agricultural and other applications are provided by U.S. Pat. Nos. 4,198,025 to Lowe et al, 3,951,373 of Swenson et al, 3,701,499 of Schubert et al and 3,233,886 of Saffell et al.

An active suspension system of the type described in the above-noted articles by Suggs and Stikeleather has considerable attractiveness from a theoretical standpoint. Assuming the vibrometer is able to follow the low frequency motions undergone by the tractor, it is only necessary to design a servo system which causes the seat to move vertically in an out-of-phase relationship with the low frequency motions of the tractor. The ideal active suspension system would move the seat in a vertical direction relative to the tractor as necessary so as to maintain the seat in a horizontal plane as the tractor moves up and down in response to bumps or otherwise varying terrain which causes the low frequency motions. However, while such a system has much attractiveness from a theoretical standpoint, actually building such a system presents a number of practical problems which are not acknowledged, let alone solved, by the above-noted articles.

One such problem relates to a type of safety problem inherent in most active suspension systems. Thus, so long as the vibrometer or other sensing instrument is capable of accurately following vehicle motion, the seat will be positioned in such a way as to optimize operator comfort. However, situations may occur where the vibrometer becomes incapable of following the vehicle motion. For example, in the case of extreme bumps or jolts the suspended mass or other moving member within the vibrometer may be incapable of traveling the distance required at the speed required so as to accurately follow the vehicle motion. A related problem relates to the fact that the seat and the active suspension therefor cannot move beyond a predetermined range. As a result, in the case of extreme bumps or jolts the vertical seat movement may become in-phase with the vehicle movement so that the seat begins to move in the wrong direction. When this occurs the active suspension system acts to amplify rather than attenuate the effects of vehicle motion at the seat. Such results are disturbing at the very least and can become so dangerous as to cause the operator to be thrown from the seat or to lose control of the vehicle.

Further problems relates to the desirability of varying such things as the sensitivity and stiffness of the system in addition to the initial height of the seat. For certain conditions of operation it may be desirable to make the suspension system highly sensitive. At the same time high sensitivity may not be desired for other conditions of operation, and particularly when the active suspension system is first turned on. It is preferable to allow the operator at least some time to become accustomed to the suspension system before a state of high responsiveness is entered. It is also generally desirable to be able to vary the rate at which the seat is moved in response to the vibrometer, and thereby the stiffness of the suspension system. Different types of rides and bumpy conditions dictate different degrees of stiffness desired in the suspension system for optimum operator comfort. Another desirable feature would be the ability to initially adjust the height of the seat electronically from the control circuit where desired.

Vibrometers are difficult to find in commercially available form, and those which are so available tend to be unsuited for use in an active tractor seat suspension system. The consequent custom designing of a vibrometer for such applications is difficult and expensive and frequently results in an arrangement which is impractical and of unwieldy size.

Accordingly, it is an object of the invention to provide an improved active seat suspension system including the control system therefor.

It is a further object of the invention to provide an active seat suspension control system which is automatically disabled when either of opposite extremes of motion of the vibrometer is encountered.

It is a still further object of the invention to provide an active seat suspension control system providing for the adjustment of sensitivity, stiffness and initial seat height electronically.

It is a still further object of the invention to provide an improved vibrometer ideally suited for use in an active seat suspension control system with agricultural tractors and similar vehicles.

BRIEF DESCRIPTION OF THE INVENTION

These and other objects are accomplished in accordance with the invention by a system in which a vibrometer and a seat vary the wiper arms of an opposite pair of potentiometers within a bridge circuit. The difference in the outputs of the potentiometers at the wiper arms thereof is used to control the application of pressurized fluid to either input of a double input hydraulic cylinder controlling the height of the seat. The application of the fluid is blocked so as to disable the system whenever a suspended mass within the vibrometer reaches either of opposite vertical limit positions. The system remains disabled with the seat being controlled by a conventional suspension system until reset by a switch which simultaneously adjusts a gain control within the bridge circuit for minimum sensitivity. The bridge circuit further includes a stiffness control adjustment and an initial seat height adjustment, both of which accomplish these goals electronically.

In a preferred embodiment of an active seat suspension control system in accordance with the invention, disablement of the system is accomplished by a coil operated emergency shutoff valve which prevents the flow of pressurized fluid to the seat height adjusting cylinder when energization is removed from the coil. Such coil energization is removed when either of opposite limit switches is contacted by the moving mass within the vibrometer and thereby opened. The control system which is powered from the power supply for the vehicle is also disabled whenever the ignition switch which is coupled between the power supply and the control circuit is open. Resetting of the system to restore active control to the seat is accomplished by a reset switch which changes the state of a relay to apply energization to the coil at the emergency shutoff valve so long as the ignition switch and the opposite limit switches are closed. Closure of the reset switch also adjusts a variable resistor serially coupled with a source of potential across opposite legs of the bridge circuit for minimum gain or sensitivity. Thereafter, the sensitivity can be increased by the operator via the variable resistor. Stiffness of the control system which is determined by the rate of response of the seat to the vibrometer is controlled by a pair of variable resistors coupled in the opposite legs of the bridge circuit and arranged to be adjusted together and by substantially equal amounts. A further variable resistor within one of the legs of the bridge circuit performs initial height adjustment of the seat.

In a preferred embodiment of the vibrometer, the spring suspension for the mass is provided by a rod which is fixedly mounted at one end thereof and which has a laterally extending arm mounted on the opposite end thereof. The mass is suspended from the outer end of the arm opposite the rod by a length of cable secured to the top of the arm and extending through at least a portion of a groove in the outer periphery of the arm. The fixedly mounted end of the rod is adjusted as necessary so that the arm initially assumes a generally horizontal position. Thereafter, as the tractor undergoes motion, the mass responds by moving up and down as a result of twisting of the rod about its axis of elongation. The arm and included end of the rod are enclosed in a housing which also mounts one of the potentiometers of the bridge circuit, the potentiometer being adjusted in response to twisting of the end of the rod as the mass undergoes vertical motion in response to movement of the tractor. The mass is preferably contained within a hollow, generally vertically disposed tube extending downwardly from the bottom end of the housing.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 5 is a sectional view of a portion of FIG. 4 taken along the line 5—5 thereof;

FIG. 6 is a top view of the arm shown in FIG. 4;

FIG. 7 is an opposite end view of the vibrometer of FIG. 3; and

FIG. 8 is a top view of the portion of the vibrometer shown in FIG. 7.

DETAILED DESCRIPTION

Figure 1:
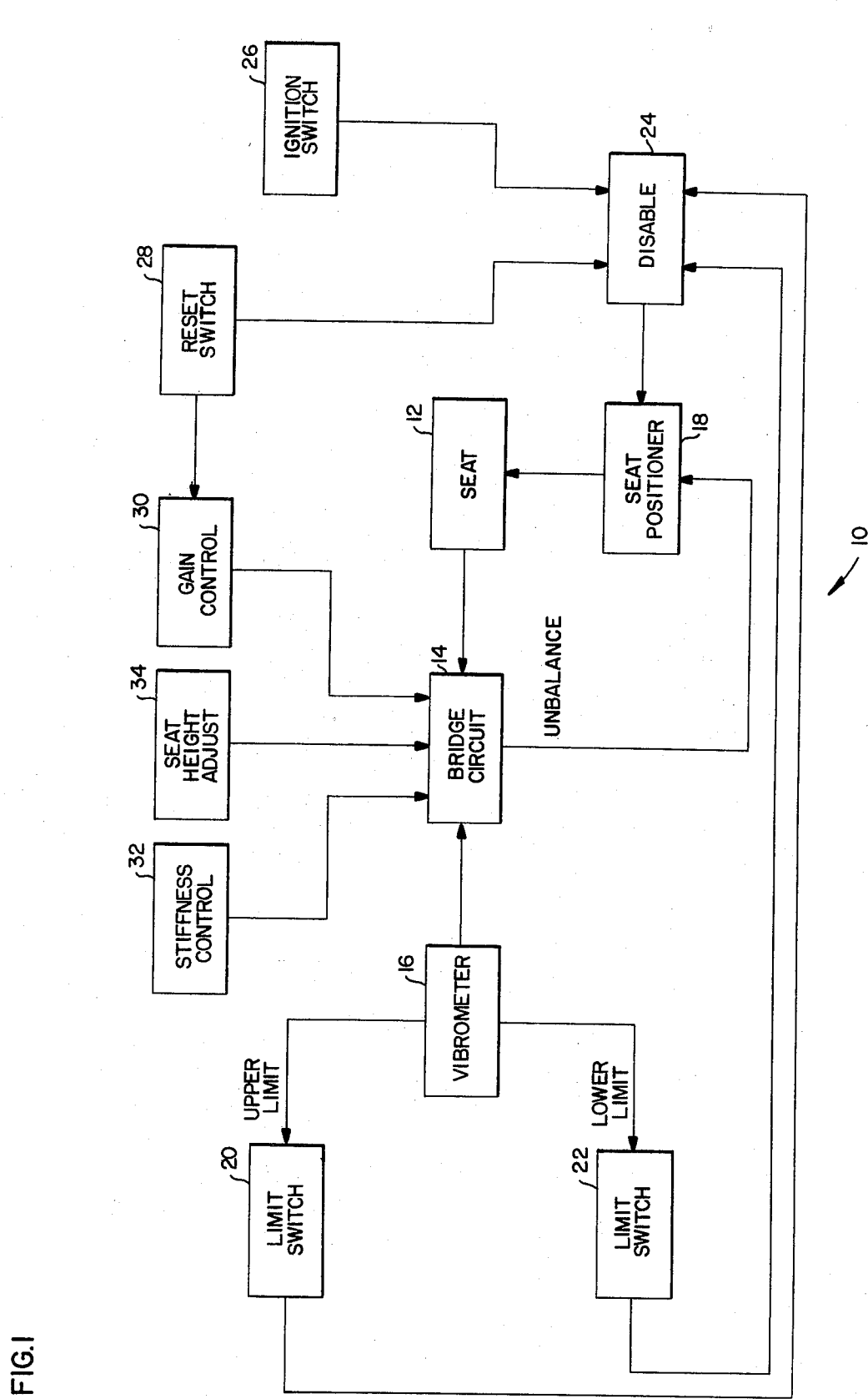
FIG. 1 is a block diagram of an active seat suspension control system in accordance with the invention.

FIG. 1 depicts an active seat suspension control system 10 in accordance with the invention. The control system 10 includes a seat 12 which is assumed to be the seat of a tractor in the present example but which in actuality could comprise the seat of other types of vehicles which undergo the type of motion which produces substantial low frequency vibration. The seat 12 is coupled to one side of an electrical bridge circuit 14. The other side of the bridge circuit 14 is coupled to a vibrometer 16. As described hereafter, the vibrometer 16 includes a suspended mass which undergoes relative vertical motion in response to the tractor or other vehicle having the seat 12 and mounting the control system 10. A potentiometer at the input to the bridge circuit 14 from the vibrometer 16 is varied in accordance with the vertical position of the mass. An output from the bridge circuit 14 which is provided to a seat positioner 18 represents the difference between the input from the vibrometer 16 to the bridge circuit 14 and a corresponding input to the bridge circuit 14 from the seat 12. As described hereafter, the input from the seat 12 is comprised of adjustment of a potentiometer within the bridge circuit 14 in accordance with the vertical position of the seat 12.

The seat positioner 18 responds to the unbalance signal at the output of the bridge circuit 14 by vertically positioning the seat 12 so as to achieve a balanced condition at the bridge circuit 14. The bridge circuit 14 and the seat positioner 18 therefor function as a servo circuit which effectively responds to the vertical position of the mass within the vibrometer 16 by making corresponding adjustments in the vertical position of the seat 12.

The movable mass within the vibrometer 16 has predetermined upper and lower limits of movement. Limit switches 20 and 22 are respectively located at these limits. The switches 20 and 22 are pressure sensitive so as to open when contacted by the mass. The upper and lower limits are selected based on the known responsiveness of the control system and the limits of vertical movement of the seat 12. For example, the upper and lower limits represent vertical positions of the mass 5 beyond which the seat 12 would be driven to its opposite vertical limits and may become out-of-phase with the vibrometer mass. The upper and lower limits are also chosen to prevent vibration of the vibrometer mass from driving the seat 12 to its limits and possibly in a 10 manner which is in-phase with the vibrations. When either of the limit switches 20 and 22 is opened by the vibrometer mass reaching the corresponding limit position, a disable circuit 24 responds by disabling the seat positioner 18. This removes active control from the seat 15 12, allowing the seat to assume a natural position in accordance with the supporting springs or other suspension therefore.

An ignition switch 26 for the tractor is coupled to the disable circuit 24. When the tractor is not operating and 20 the ignition switch 26 is therefore open, the disable circuit 24 responds to the open condition of the ignition switch 26 by maintaining the seat positioner 18 in the disabled condition. When operation of the tractor is to be commenced, the ignition switch 26 is closed. The 25 disable circuit 24 is activated and thereby ready to remove the disabling condition from the seat positioner 18 as soon as reset by a reset switch 28.

The reset switch 28 must be closed to reactivate the seat positioner 18 each time the seat positioner 18 is 30 disabled by the disable circuit 24 in response to opening of the ignition switch 26 or one of the limit switches 20 and 22. In addition to reactivating the seat positioner 18, closure of the reset switch 28 also moves a gain control 30 to a minimum gain position.

The gain control 30 forms a part of the bridge circuit 14 and enables the sensitivity of the bridge circuit 14 to be varied as desired. As described hereafter in connection with FIG. 2 the gain control 30 has the effect of varying the voltage of the power supply of the bridge 40 circuit 14. A given difference between the vertical positions of the seat 12 and the vibrometer 16 produces a larger unbalance signal at the output of the bridge circuit 14, causing the seat positioner 18 to respond more quickly in attempting to position the seat 12 at the 45 height dictated by the vibrometer 16. As previously noted, when the disable circuit 24 is reset by the reset switch 28, the gain control 30 is simultaneously moved to the minimum gain position. It is desirable to begin operation of the tractor with a minimum gain condition 50 so that movements of the seat 12 are relatively slow and unaccentuated. After the operator has a chance to become adjusted to operating the vehicle and has developed a feel for the conditions and the terrain, the gain control 30 can be used to increase the sensitivity to an 55 extent desired by the operator.

The bridge circuit 14 also includes a stiffness control 32. As described hereafter in connection with FIG. 2, for a given setting of the gain control 30 the stiffness control 32 varies the total voltage used in generating the 60 signal within the bridge circuit 14 representing the vertical position of the seat 12. This varies the distance at which the seat 12 is moved in response to the vibrometer 16, with the practical effect that the stiffness of the seat 12 is thereby varied.

The bridge circuit 14 also includes a seat height adjust 34 which provides for initial adjustment of the height of the seat 12. As described hereafter in connection with FIG. 2 the seat height adjust 34 has the effect of producing an unbalance signal at the output of the bridge circuit 14 in the face of a steady state condition between the seat 12 and the vibrometer 16, causing the seat positioner 18 to raise or lower the seat 12 in accordance with the unbalance signal from the bridge circuit 14.

Figure 2:
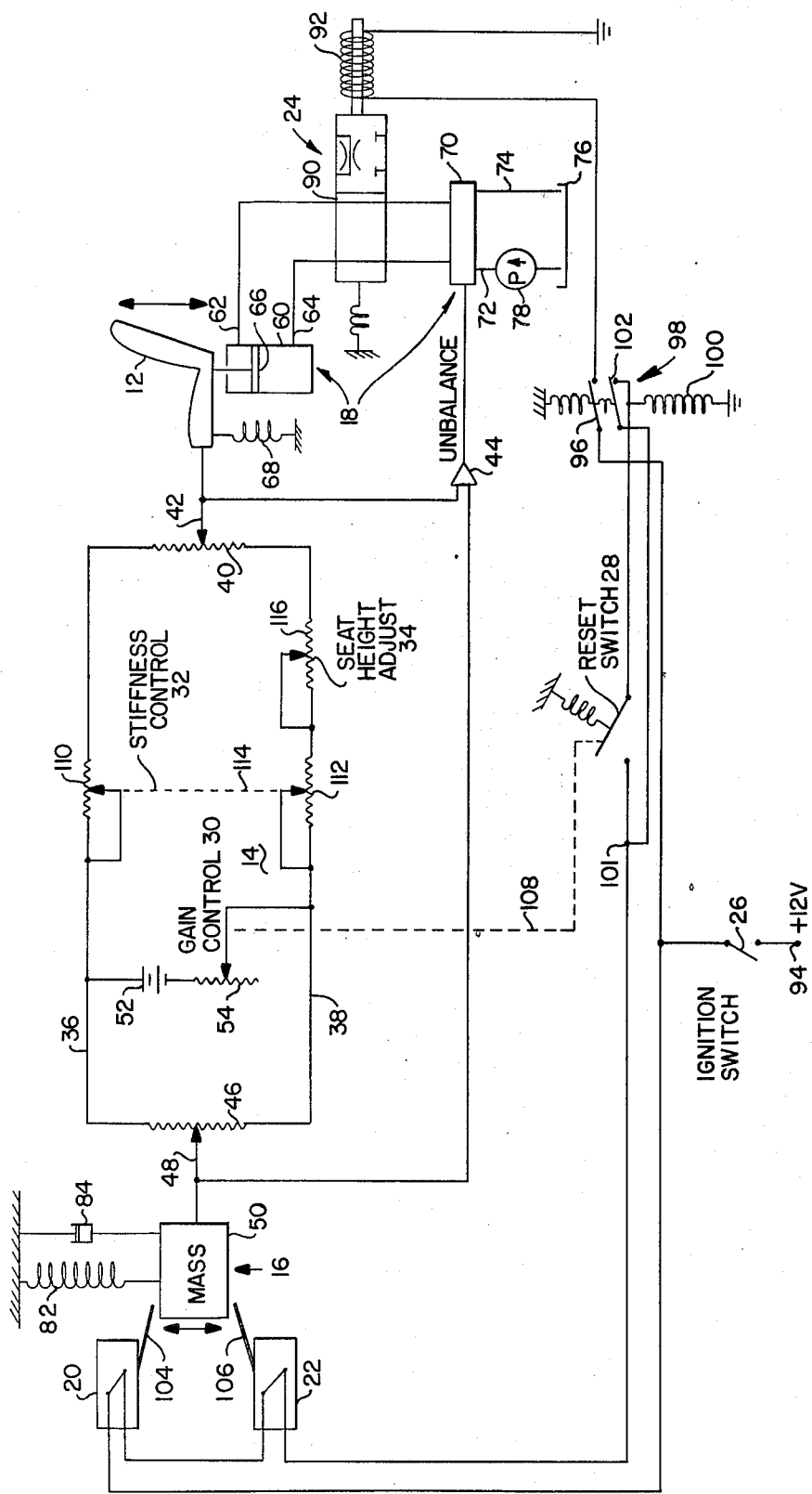
FIG. 2 is a schematic diagram of a preferred embodiment of the control system of FIG. 1.

The active seat suspension control system 10 of FIG. 1 is shown in FIG. 2 in greater detail. As shown in FIG. 2 the bridge circuit 14 has opposite legs 36 and 38. A seat potentiometer 40 is coupled between the legs 36 and 38 at one end of the bridge circuit 14 and includes a wiper arm 42 mechanically coupled to the seat 12. As the seat 12 is raised and lowered, the wiper arm 42 is moved along the seat potentiometer 40. The wiper arm 42 provides an output of the seat potentiometer 40 which is coupled to a first input of a differential amplifier 44. The bridge circuit 14 also includes a vibrometer potentiometer 46 coupled between the opposite legs 36 and 38 at the opposite end of the bridge circuit 14 from the seat potentiometer 40. The vibrometer potentiometer includes a wiper arm 48 mechanically coupled to a weight or mass 50 within the vibrometer 16. As the mass 50 undergoes vertical movement, the wiper arm 48 responds by moving along the vibrometer potentiometer 46. The wiper arm 48 provides an output of the vibrometer potentiometer 46 which is coupled to a second input of the differential amplifier 44. The bridge circuit 14 also includes a source of potential 52. The source of potential 52 is coupled across the legs 36 and 38 together with a gain control potentiometer 54 which comprises the gain control 30.

The seat positioner 18 includes a double ended hydraulic cylinder 60 having a pair of inputs 62 and 64 on the opposite sides of a piston 66. The piston 66 is mechanically coupled to the seat 12 which is also resiliently mounted as represented by a spring 68. The inputs 62 and 64 of the piston valve 60 are coupled to an electro-hydraulic valve 70. The electro-hydraulic valve 70 which is coupled to be operated by the unbalance signal from the differential amplifier 44 has two different inputs 72 and 74. The input 72 is coupled to a source of hydraulic fluid in the form of a sump 76 through a pump 78. The input 74 is coupled to the sump 76. The electro-hydraulic valve 70 operates to provide pressurized fluid to the input 62 or the input 64 of the cylinder 60 in accordance with the unbalance signal from the differential amplifier 44. Fluid is provided to the input 62 or the input 64 in accordance with the polarity of the unbalance signal and by an amount corresponding to the magnitude of the unbalance signal. This has the effect of forcing the piston 66 and the coupled seat 12 up or down. The seat 12 is held by the cylinder 60 and the electro-hydraulic valve 70 in a given position when the unbalance signal from the differential amplifier 44 reduces to zero.

The mass 50 within the vibrometer 16 is suspended from a fixed reference point by a resilient support in the form of a spring 82. The spring 82 is selected so as to allow the mass 50 to undergo vertical motion at a natural frequency on the order of 0.1 or 0.2 hertz. These frequencies are below the range of low frequency vibrations which are compensated for by the active seat suspension control system. A damping piston 84 may also be coupled between the mass 50 and the fixed reference where desired.

The source of potential 52 of the bridge circuit 14 provides a like voltage drop across each of the potentiometers 40 and 46. Accordingly, if the wiper arms 42 and 48 are positioned at the same locations along the potentiometers 40 and 46, the signals at the two inputs of the differential amplifier 44 are equal and produce an unbalance signal of zero value. The electro-hydraulic valve 70 and the cylinder 60 respond by maintaining the vertical position of the seat 12. As vibrations are encountered by the tractor, the mass 50 within the vibrometer 16 begins to undergo up and down motion at low frequency. As this occurs, the wiper arm 48 moves up and down along the potentiometer 46, producing a signal at the corresponding input of the differential amplifier 44 which differs from the signal from the wiper arm 42 of the seat potentiometer 40. The differential amplifier 44 responds to these differences in the input signals by producing an unbalance signal of appropriate polarity and magnitude. As previously noted the electro-hydraulic valve 70 responds by applying pressurized hydraulic fluid in an appropriate amount to an appropriate one of the inputs 62 and 64 of the cylinder 60 to position the seat 12 accordingly. In this manner the vertical position of the seat 12 follows that of the mass 50. The suspension of the mass 50 provided by the spring 82 ideally causes up and down motion of the mass 50 relative to the vehicle so that the mass 50 remains in a horizontal plane as the vehicle undergoes up and down movement in response to bumps and uneven terrain. This has the effect of maintaining the seat 12 within a substantially horizontal plane so as to optimize operator comfort as the vehicle undergoes up and down motion.

The disable circuit 24 includes an emergency shutoff valve 90 having a coil 92. When the coil 92 is energized the valve 90 has no effect on the inputs 62 and 64 of the cylinder 60. However, when the coil 92 is deenergized, the valve 90 uncouples the inputs 62 and 64 from the electro-hydraulic valve 70 and effectively couples the inputs 62 and 64 of cylinder 60 together to terminate control of the seat 12 by the bridge circuit 14. In this condition the cylinder 60 and its included piston 66 behave in the manner of a conventional shock absorbing piston and combine with the spring 68 to form a conventional seat suspension. The coil 92 is coupled to the +12 volt vehicle power supply at a terminal 94 through the ignition switch 26 and a switch 96 formed by the contacts of a relay 98. The relay 98 maintains the switch 96 closed so as to couple the coil 92 to the terminal 94 via the ignition switch 26 so long as a coil 100 of the relay 98 is energized. The relay coil 100 is in turn energized by a circuit path which includes the power supply terminal 94, the limit switches 20 and 22, a terminal 101 and a switch 102 formed by the contacts of the relay 98.

When the ignition switch 26 is closed to start the tractor the relay coil 100 remains deenergized since the relay switch 102 is open. The valve coil 92 remains deenergized and the valve 90 maintains the seat positioner 18 disabled. Upon momentary closure of the reset switch 28 a circuit is completed from the power supply terminal 94 through the limit switches 20 and 22 to the relay coil 100, thereby energizing the coil 100 and closing the switches 96 and 102. Closure of the switch 102 completes a separate circuit path to the relay coil 100 from the terminal 101 so as to maintain the coil 100 energized after the reset switch 28 is released. With the relay coil 100 energized the switch 96 remains closed. The closed switch 96 completes a circuit path from the power supply terminal 94 through the closed ignition switch 26 to energize the valve coil 92. With the valve coil 92 energized, the emergency shutoff valve 90 is positioned so as to have no effect on the couplings between the electrohydraulic valve 70 and the cylinder 60.

The limit switches 20 and 22 are of the pressure sensitive type. The switch 20 which has a pressure sensitive contact 104 remains closed except when the contact 104 is touched by the mass 50. Similarly, the limit switch 22 has a pressure sensitive contact 106 which allows the switch 22 to remain closed except when contacted by the mass 50. The pressure sensitive contacts 104 and 106 define opposite limits of vertical movement for the mass 50. As previously noted it is desirable to deactivate the active seat suspension system when the vibrometer mass begins to go beyond predetermined safe limits of vertical movement. Such conditions may occur when such extreme bumps are encountered as to tend to drive the seat 12 beyond its limits and also when movement of the vibrometer mass is such that the seat positioner 18 cannot accurately follow and begins to get out-of-phase. Contact of either of the pressure sensitive contacts 104 and 106 by the mass 50 momentarily opens the switch 20 or 22 respectively. When this occurs, the circuit path between the power supply terminal 94 and the relay coil 100 is opened long enough to deenergize the relay coil 100. When this occurs the relay 98 opens the switches 96 and 102. Opening of the switch 96 terminates energization of the valve coil 92, resulting in movement of the emergency shutoff valve 90 into the disable position. At the same time opening of the switch 102 has the effect of removing the alternate circuit path from the terminal 101 so as to maintain the relay coil 100 deenergized when the limit switches 20 and 22 are again both closed. The seat positioner 18 remains disabled until the reeset switch 28 is momentarily closed by actuation thereof. When this occurs a circuit is completed from the power supply terminal 94 to the relay coil 100, energizing the coil 100 and closing the relay switches 96 and 102 so as to energize the valve coil 92 and maintain the relay coil 100 energized.

When use of the tractor is terminated by opening the ignition switch 26, this action also breaks the circuit connection between the power supply terminal 94 and the relay coil 100 so as to open the switches 96 and 102. The resulting deenergizing of the valve coil 92 shifts the emergency shutoff valve 90 into the disable position.

As previously noted the gain control 30 comprises the gain control potentiometer 54. The potentiometer 54 is coupled as a variable resistor between the circuit leg 38 of the bridge circuit 14 and the source of potential 52. The gain control potentiometer 54 varies the amount of resistance between the source of potential 52 and the circuit leg 38 and thereby the total voltage drop across both the seat potentiometer 40 and the vibrometer potentiometer 46. Minimum gain is provided when the potentiometer 54 is adjusted to provide maximum resistance and thereby minimum voltage drops across the potentiometers 40 and 46. With relatively small voltage drops across the potentiometers 40 and 46, an unbalance condition results in a relatively small signal at the output of the differential amplifier 44 with the result that the seat 12 is moved relatively slowly in the attempt to follow the vibrometer mass 50. At the other extreme, maximum gain is provided by adjustment of the potentiometer 54 to provide minimum resistance and thereby maximum voltage drops across the potentiometers 40 and 46. In this situation a given amount of unbalance will produce a greater signal difference at the differential amplifier 44 as compared with the minimum gain condition. This results in the seat 12 being moved more rapidly so as to define a condition of much greater sensitivity. The reset switch 28 is mechanically coupled to the gain control potentiometer 54 via a mechanical linkage represented by the dashed line 108 in FIG. 2. Each time the reset switch 28 is actuated, the gain control potentiometer 54 is adjusted for maximum resistance and thereby minimum gain, where the potentiometer 54 remains until such time as the operator may adjust the potentiometer 54 to provide greater sensitivity.

The stiffness control 32 within the bridge circuit 14 comprises an opposite pair of potentiometers coupled as variable resistors 110 and 112 within the circuit legs 36 and 38 respectively. The variable resistors 110 and 112 are coupled in the circuit legs 36 and 38 between the source of potential 52 and the seat potentiometer 40. The variable resistors 110 and 112 are mechanically coupled together as represented by a dashed line 114 so as to be positioned in like positions at all times and to be changed simultaneously and by substantially like amounts. In this manner the variable resistor 110 presents substantially the same resistance within the circuit leg 36 as does the variable resistor 112 within the circuit leg 38. For a given setting of the gain control potentiometer 54, the variable resistors 110 and 112 are capable of varying the voltage drop across the seat potentiometer 40 while the voltage drop across the vibrometer potentiometer 46 remains constant. Thus, for a given deviation of the vibrometer mass 50, the seat 12 can be caused to be repositioned to a greater or lesser extent depending upon the voltage drop across the seat potentiometer 40 as determined by the variable resistors 110 and 112. This has the effect of varying the stiffness of the seat 12.

The seat height adjust 34 within the bridge circuit 14 comprises a potentiometer coupled as a variable resistor 116. For given settings of the gain control potentiometer 54 and the variable resistors 110 and 112, adjustment of the variable resistor 116 varies s the voltage drop between the lower end of the seat potentiometer 40 and the wiper arm 42. When the control system 10 is in a steady state and not undergoing any motion, adjustment of the variable resistor 116 and thereby the voltage drop across the lower portion of the seat potentiometer 40 has the effect of producing an unbalance signal to cause repositioning of the height of the seat 12. In this manner the height of the seat 12 can be initially determined before operation of the tractor is commenced.

As previously noted the mass 50 and the spring 82 within the vibrometer 16 must be selected to provide movement of the mass at a low frequency on the order of 0.1 or 0.2 hertz which is lower than the low frequency vibration of the tractor to be compensated for. Where the mass 50 is to be suspended by a spring 82 from a fixed reference as shown in FIG. 2, it has been found that an arrangement which works satisfactorily includes a mass comprised of a piece of steel 3" long by 1⅛" in diameter and weighing about 1 lb. Such mass is attached to a spring made from a steel wire approximately 1/16" in diameter and approximately 40" long wound into a coil which is about 12" in diameter. Alternatively, the spring 82 can be comprised of a rod mounted so as to twist along the axis of elongation thereof to provide the desired spring action. Such an arrangement is shown in FIGS. 3-8.

Figure 3:
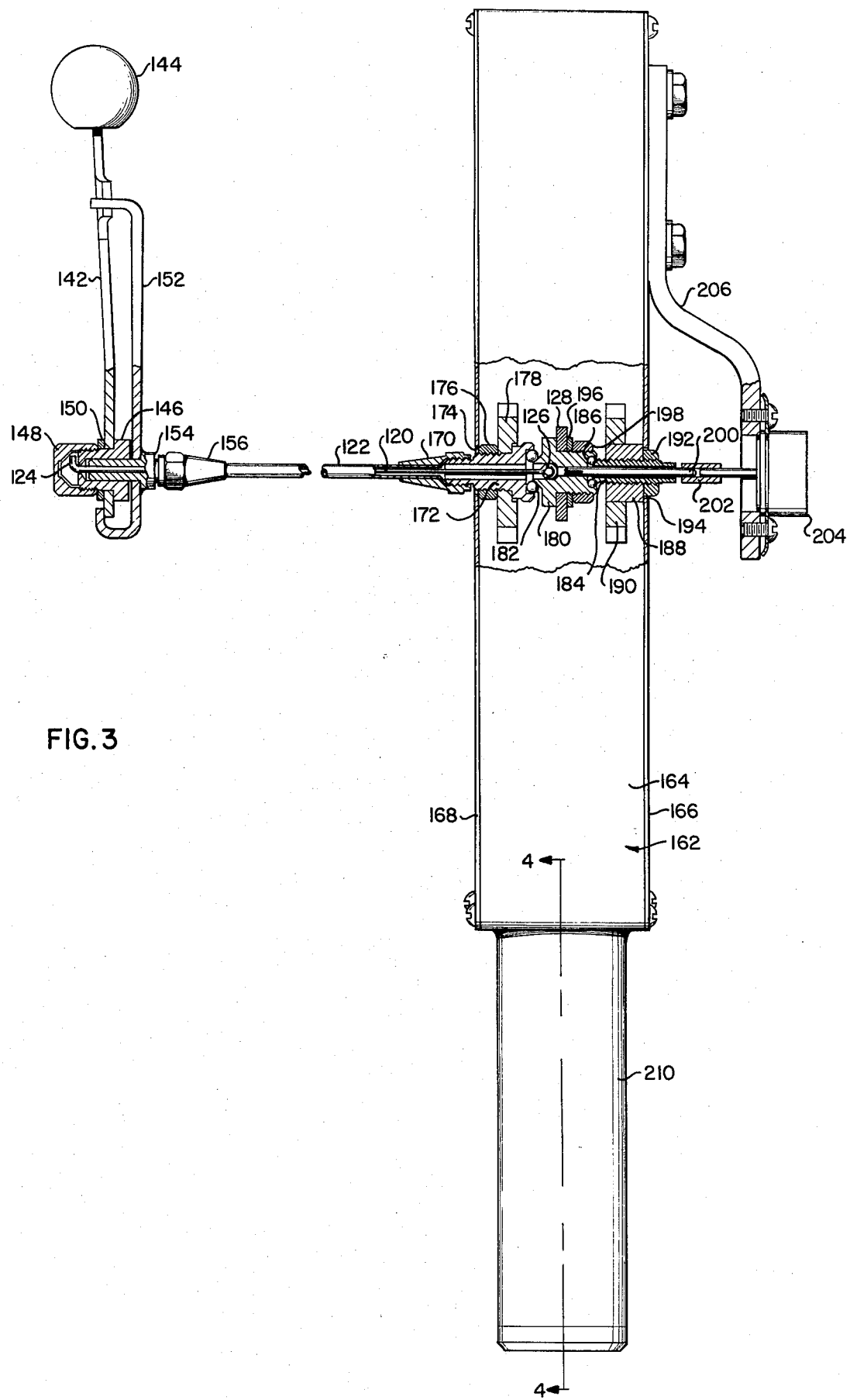
FIG. 3 is a side view, partly broken away and partly in section, of a preferred embodiment of the vibrometer in the control system of FIG. 2, the portion of FIG. 3 in section being taken along the line 3—3 of FIG. 4.
Figure 4:
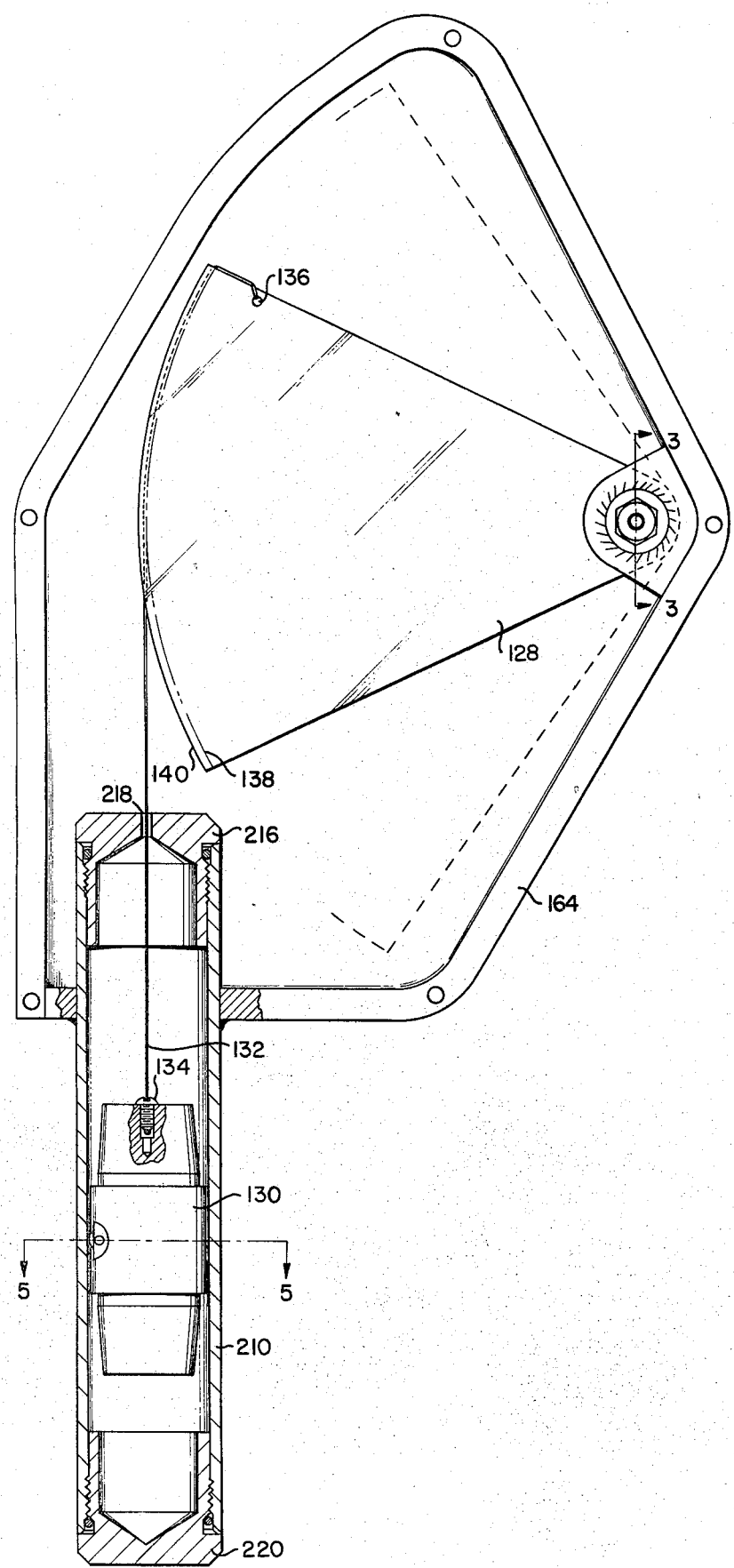
FIG. 4 is a front view, partly broken away and partly in section, of the vibrometer of FIG. 3, the portion of FIG. 4 in section being taken along the line 4—4 of FIG. 3.

Referring to FIG. 3 the vibrometer 16 shown in FIGS. 3-8 includes an elongated rod 120 of circular cross-section journaled within a surrounding tube 122. The rod 120 is fixedly mounted at one end 124 thereof and is free to rotate at an opposite end 126 thereof. As shown in FIG. 4 an arm 128 is mounted on the free end 126 of the rod 120 so as to extend outwardly from the rod 120 in a generally horizontal position. A weight 130 comprising the mass 50 of FIG. 2 is suspended from the outer end of the arm 128 opposite the rod 120 by a length of cable 132. The length of cable 132 has one end thereof coupled to the weight 130 via a screw 134 and the opposite end thereof attached to the upper end of the arm 128 through a hole 136 in the arm. From the hole 136 the cable 132 extends downwardly along a portion of a groove 138 formed in an outer edge 140 of the arm 128. The outer edge 140 of the arm 128 forms an arc of a circle such that the cable 132 is tangent to the arm 128 for different rotational positions of the arm 128. FIG. 6 is a top view of the arm 128 without the cable 132.

The end 124 of the rod 120 is fixedly coupled to the lower end of a lever 142 having a knob 144 at the upper end thereof. The end 124 of the rod 120 is attached to the lower end of the lever 142 via a bushing 146 which is disposed on one side of the lever 142 and which is engaged by a cap nut 148 via a washer 150. The end 124 of the rod 120 is journaled for rotation within the lower end of a quadrant assembly 152 by a pivot 154. The tube 122 terminates at a nut 156 disposed adjacent the pivot 154.

The axial disposition of the end 124 of the rod 120 is adjusted by the lever 142 which is rotatable relative to the quadrant assembly 152. As shown in FIGS. 7 and 8 the upper end of the lever 142 includes a pawl 158 for engaging one of a plurality of teeth 160 at the upper end of the quadrant assembly 152. The lever 142 is of sufficient resiliency that it can be bent outwardly via the knob 144 to disengage the pawl 158 from the teeth 160. With the pawl 158 so disengaged, the lever 142 can be rotated so as to rotate the end 124 of the rod 120. The lever 142 is then locked into place by releasing the pressure on the knob 144 after the pawl 158 is engaged in one of the teeth 160. Adjustment of the axial position of the end 124 of the rod 120 using the lever 142 is provided so that the arm 128 can be oriented into a horizontal position as seen in FIG. 4.

The free end 126 of the rod 120 is positioned within a housing 162 together with the arm 128. The housing 162 is comprised of a frame 164 and a pair of plates 166 and 168 mounted on the opposite sides of and sandwiching the frame 164 therebetween. The end of the tube 122 adjacent the end 126 of the rod 120 is received within a nut 170 similar to the nut 156 and which is disposed immediately outside of the plate 168. The free end 126 of the rod 120 which extends beyond the nut 170 is disposed within a cup 172 which extends through an aperture 174 in the plate 168 into the interior of the housing 162. A nut 176 engages a portion of the outer periphery of the cup 172 and extends between the inside of the plate 168 and a bracket 178 which receives the cup 172 and which is mounted on the inner wall of the frame 164.

The end 126 of the rod 120 terminates within and is attached to a cone 180 separated from the inner end of the cup 172 by a plurality of bearing balls 182. The opposite end of the cone 180 engages a set screw 184 via a plurality of bearing balls 186. The set screw 184 is received within a bushing 188 which in turn is received within a bracket 190 mounted on the inner wall of the frame 164. A jamb nut 192 engages the outside of the set screw 184 and abuts the end of the bushing 188 so as to reside within an aperture 194 in the plate 166. The bearing balls 182 and 186 provide for rotation of the cone 180 relative to the cup 172 and the set screw 184. The arm 128 is mounted on the outside of the cone 180 and is secured thereto by a washer 196 and a nut 198. This permits the arm 128 to pivot up and down in response to forces exerted thereon by the weight 130 as the rod 120 undergoes twisting.

A shaft 200 is disposed within the set screw 184 so as to be coupled to the interior of and rotate with the cone 180 as the arm 128 rotates. The shaft 200 is coupled via a collar 202 to the shaft of a potentiometer 204. The potentiometer 204 which corresponds to the vibrometer potentiometer 46 of FIG. 2 is mounted on the lower end of a bracket 206 coupled to and extending outwardly from the housing 162. Accordingly, as the arm 128 rotates, the cone 180 and in turn the shaft 200 rotate so as to rotate the shaft coupled to the wiper arm corresponding to the wiper arm 48 in FIG. 2.

A hollow tube 210 is generally vertically disposed so as to extend downwardly through the bottom of the frame 164 as seen in FIGS. 3 and 4. The tube 210 receives the weight 130 for sliding, vertical movement therein. As seen in FIG. 5, sliding movement of the weight 130 within the tube 210 is facilitated by three different rollers 212 rotatably mounted within the weight 130 by dowel pins 214. The rollers 212 protrude slightly from the outer surface of the weight 130 so as to bear against the inner wall of the tube 210. The rollers 212 rotate about the dowel pins 214 to facilitate upward and downward movement of the weight 130 within the tube 210. The upper end of the tube 210 is enclosed by a plug 216 having a central aperture 218 therein for receiving the cable 132. The opposite lower end of the tube 210 is enclosed by a plug 220 which seals the tube so that a low viscosity fluid may be placed in the tube to surround the weight 130 and provide damping. Although not shown in FIG. 4 the limit switches 20 and 22 of FIG. 2 are located relative to the tube 210 so that the pressure sensitive contacts 104 and 106 thereof are disposed within the tube 210 in the path of the weight 130.

While the invention has been particularly shown and described with reference to preferred embodiments thereof, it will be understood by those skilled in the art that various changes in form and details may be made therein without departing from the spirit and scope of the invention.

What is claimed is:

1. An active seat suspension control system comprising the combination of:
    a vibrometer having a vertically movable mass therein and operative to provide a signal representing the vertical position of the mass;
    a seat;
    means for providing a signal representing the vertical position of the seat;
    an electrical bridge circuit coupled to receive the signal representing the vertical position of the mass and the signal representing the vertical position of the seat and operative to provide a signal representing the difference between the signals;
    means for adjusting the height of the seat in accordance with the signal representing the difference; and
    means for disabling the means for adjusting the height of the seat when the mass of the vibrometer reaches either of an opposite pair of predetermined limits of vertical position of the mass.

2. The invention set forth in claim 1, further comprising a source of power and a vehicle ignition switch coupling the source of power to the means for disabling, the means for disabling being operative to disable the means for adjusting the height of the seat when the ignition switch is turned off.

3. The invention set forth in claim 1, wherein the means for disabling includes an electrical circuit coupled to disable the means for adjusting the height of the seat when opened and a pair of switches coupled in the circuit, either of the pair of switches opening the circuit when the mass of the vibrometer reaches an associated one of the opposite pair of predetermined limits of vertical position of the mass.

4. The invention set forth in claim 3, further comprising a source of power, a vehicle ignition switch and means coupling the source of power to the electrical circuit through the ignition switch, the means for adjusting the height of the seat being disabled when the ignition switch is turned off.

5. The invention set forth in claim 3, further including a relay having contacts coupled in the electrical circuit, the relay being responsive to the opening of the electrical circuit to hold the electrical circuit open until reset and a manually actuable reset switch coupled to reset the relay.

6. The invention set forth in claim 5, further including a gain control coupled to the bridge circuit and capable of varying the sensitivity of the bridge circuit and means for setting the gain control for minimum sensitivity in response to actuation of the reset switch.

7. The invention set forth in claim 1, wherein the means for adjusting the height of the seat includes a cylinder coupled to the seat and having an opposite pair of inputs and means for applying pressurized fluid to one of the pair of inputs of the cylinder in accordance with the value of the signal representing the difference, and wherein the means for disabling includes a shutoff valve coupled to the two inputs of the cylinder and operative to couple the two inputs of the cylinder together when the mass of the vibrometer reaches either of the opposite pair of predetermined limits of vertical position of the mass.

8. The invention set forth in claim 7, wherein the means for disabling includes a coil coupled to disable the shutoff valve when energized, an electrical circuit coupled to energize the coil when closed and a pair of switches coupled in the electrical circuit, each of the pair of switches opening the electrical circuit when the mass of the vibrometer reaches one of the opposite pair of predetermined limits of vertical position.

9. The invention set forth in claim 1, wherein the vibrometer comprises the combination of:
    an elongated rod;
    means for securing the rod to a reference at one end thereof;
    an arm coupled to and extending generally laterally from the opposite end of the rod from the one end;
    a weight;
    means for suspending the weight from a portion of the arm opposite the rod; and
    means for providing a signal representing the vertical position of the weight.

10. The invention set forth in claim 9, wherein the means for securing the rod to a reference at one end thereof is adjustable relative to an axis of elongation of the rod to initially dispose the rod in a generally horizontal position.

11. The invention set forth in claim 9, wherein the means for providing a signal comprises a potentiometer having a wiper arm coupled to the opposite end of the rod.

12. The invention set forth in claim 9, further including a housing containing the arm and the opposite end of the rod, the housing including at least one bearing for rotatably mounting the opposite end of the rod, and a generally vertically disposed tube extending downwardly from the housing and containing the weight therein.

13. An active seat suspension control system comprising the combination of:
 an opposite pair of circuit legs;
 a seat;
 a first potentiometer coupled between the opposite pair of circuit legs and having a wiper arm providing an output which varies with the vertical position of the seat;
 means for providing an indication of vertical position of the seat in accordance with upward and downward forces on the control system, the means comprising a vibrometer having a vertically movable mass therein and operative to provide a signal representing the vertical position of the mass;
 a second potentiometer coupled between the opposite pair of circuit legs and having a wiper arm providing an output which varies with the signal representing the vertical position of the mass;
 means responsive to the outputs of the first and second potentiometers for adjusting the vertical position of the seat in accordance with the difference between the outputs;
 a source of potential coupled to one of the opposite pair of circuit legs; and
 a variable resistor coupled between the source of potential and the other one of the opposite pair of circuit legs, the variable resistor defining a variable gain control which enables the responsiveness of the control system to be varied.

14. The invention set forth in claim 13, further including means for disabling the means for adjusting the vertical position of the seat upon the occurrence of at least one predetermined condition, means for resetting the means for adjusting the vertical position of the seat following the disabling thereof in response to a reset command, and means responsive to each resetting of the means for adjusting the vertical position of the seat for adjusting the variable resistor to a minimum gain position.

15. An active seat suspension control system comprising the combination of:
 an opposite pair of circuit legs;
 a seat;
 a first potentiometer coupled between the opposite pair of circuit legs and having a wiper arm providing an output which varies with the vertical position of the seat;
 means for providing an indication of vertical position of the seat in accordance with upward and downward forces on the control system, the means comprising a vibrometer having a vertically movable mass therein and operative to provide a signal representing the vertical position of the mass;
 a second potentiometer coupled between the opposite pair of circuit legs and having a wiper arm providing an output which varies with the signal representing the vertical position of the mass;
 means responsive to the outputs of the first and second potentiometers for adjusting the vertical position of the seat in accordance with the difference between the outputs;
 a source of potential coupled between the opposite pair of circuit legs;
 a pair of variable resistors, each being coupled in a different one of the opposite pair of circuit legs between the source of potential and the first potentiometer; and
 means for varying the pair of variable resistors together in substantially equal amounts and in the same direction relative to the first potentiometer to vary the stiffness of vertical movement of the seat.

16. An active seat suspension control system comprising the combination of:
 an opposite pair of circuit legs;
 a seat;
 a first potentiometer coupled between the opposite pair of circuit legs and having a wiper arm providing an output which varies with the vertical position of the seat;
 means for providing an indication of vertical position of the seat in accordance with upward and downward forces on the control system, the means comprising a vibrometer having a vertically movable mass therein and operative to provide a signal representing the vertical position of the mass;
 a second potentiometer coupled between the opposite pair of circuit legs and having a wiper arm providing an output which varies with the signal representing the vertical position of the mass;
 means responsive to the outputs of the first and second potentiometers for adjusting the vertical position of the seat in accordance with the difference between the outputs;
 a source of potential coupled between the opposite pair of circuit legs; and
 a variable resistor coupled in one of the opposite pair of circuit legs between the source of potential and the first potentiometer, the variable resistor being variable in value to provide initial adjustment of the height of the seat.

17. An active seat suspension control system comprising the combination of:
 an opposite pair of circuit legs;
 a seat;
 a first potentiometer coupled between the opposite pair of circuit legs and having a wiper arm providing an output which varies with the vertical position of the seat;
 a vibrometer having a suspended mass;
 a second potentiometer coupled between the opposite pair of circuit legs and having a wiper arm providing an output which varies with the vertical position of the suspended mass;
 a source of potential coupled between the opposite pair of circuit legs;
 a differential amplifier having inputs coupled to the outputs of the first and second potentiometers and an output;

an electro-hydraulic valve coupled to the output of the differential amplifier and having a pair of outputs;

an emergency shutoff valve having a coil;

a double ended cylinder coupled to the seat and having a pair of inputs, each of which is coupled to a different one of the pair of outputs of the electro-hydraulic valve through the emergency shutoff valve;

a relay having a coil and contacts defining first and second switches;

a source of power;

means for coupling the source of power to the coil of the shutoff valve through the first switch of the relay;

a terminal;

a pair of pressure sensitive switches mounted at opposite limits of vertical movement of the suspended mass;

means for coupling the pair of pressure sensitive switches in series between the source of power and the terminal;

means for coupling the terminal to the coil of the relay through the second switch of the relay;

a reset switch; and means coupling the terminal to the coil of the relay through the reset switch.

18. The invention set forth in claim 17, further including a variable resistor coupled between the source of potential and one of the opposite pair of circuit legs and means for adjusting the variable resistor to a condition of maximum resistance between the source of potential and said one of the opposite pair of circuit legs in response to each closure of the reset switch.

19. The invention set forth in claim 17, further including a first variable resistor coupled in one of the opposite pair of circuit legs between the first potentiometer and the source of potential, second and third variable resistors coupled in series in the other one of the opposite pair of circuit legs between the first potentiometer and the source of potential, and means for simultaneously making substantially equal adjustments to the first and the second variable resistors.

20. The invention set forth in claim 17, wherein the vibrometer includes an elongated rod, means for securing the rod to a reference at one end thereof, an arm coupled to and extending generally laterally from the opposite end of the rod from the one end, and wherein the mass is suspended from a portion of the arm opposite the rod.

21. A vibrometer comprising the combination of:

an elongated rod;

means for securing the rod to a reference at one end thereof;

an arm coupled to and extending generally laterally from the opposite end of the rod from the one end;

a weight;

means for suspending the weight from a portion of the arm opposite the rod;

means for providing a signal representing the vertical position of the weight;

a housing containing the arm and the opposite end of the rod, the housing including at least one bearing for rotatably mounting the opposite end of the rod; and a generally vertically disposed tube extending downwardly from the housing and containing the weight therein;

the end of the arm opposite the rod being in the shape of an arc of a circle and having a groove therein and the weight being suspended from the arm by a length of cable attached to an upper portion of the arm opposite the rod and at least partially residing within the groove.

* * * * *